(12) United States Patent
Lee et al.

(10) Patent No.: US 6,857,759 B2
(45) Date of Patent: Feb. 22, 2005

(54) BACKLIGHT ASSEMBLY AND LIQUID CRYSTAL DISPLAY APPARATUS

(75) Inventors: Tae-Jin Lee, Suwon-si (KR); Jong-Dae Park, Seoul (KR); Jeong-Hwan Lee, Suwon-si (KR); Keun-Woo Lee, Gyeonggi-do (KR); Jae-Sang Lee, Seoul (KR); Yong-Seok Choi, Suwon-si (KR); Chang-Young Bang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/390,110

(22) Filed: Mar. 17, 2003

(65) Prior Publication Data

US 2003/0227767 A1 Dec. 11, 2003

(30) Foreign Application Priority Data

Jun. 5, 2002 (KR) .......................................... 2002-31725

(51) Int. Cl.[7] .............................. F21S 4/00; F21V 7/04; G02F 1/1335
(52) U.S. Cl. ........................ 362/225; 362/219; 362/223; 362/247; 349/70; 439/235
(58) Field of Search ............................ 362/23, 29, 217, 362/219, 221–225, 240, 241, 245–247, 260; 313/318.02; 349/70; 439/235, 239, 698; 315/56–60, 169.3, 312, 324

(56) References Cited

U.S. PATENT DOCUMENTS

| | | | | |
|---|---|---|---|---|
| 1,024,573 A | * | 4/1912 | Henderson | 362/219 |
| 2,137,732 A | * | 11/1938 | Swanson | 313/318.02 |
| 2,632,096 A | * | 3/1953 | Kochale, Jr. et al. | 362/225 |
| 2,651,024 A | * | 9/1953 | Miller | 439/235 |
| 2,835,788 A | * | 5/1958 | Phillips | 362/219 |
| 2,877,340 A | * | 3/1959 | Spaulding | 362/225 |
| 6,459,203 B1 | * | 10/2002 | Kim | 349/70 |
| 6,491,411 B2 | * | 12/2002 | Itoh | 362/225 |

* cited by examiner

Primary Examiner—Alan Cariaso
(74) Attorney, Agent, or Firm—Cantor Colburn LLP (57) ABSTRACT

Disclosed is a backlight assembly and an LCD apparatus having uniform brightness and low power consumption. The backlight assembly has a plurality of lamps for providing light to the LCD panel. Each of the plurality of lamps has two or more sub-lamps connected to each other in series. The backlight assembly has a brightness control unit disposed between the sub-lamps to reduce a brightness difference.

28 Claims, 11 Drawing Sheets

BACKLIGHT ASSEMBLY AND LIQUID CRYSTAL DISPLAY APPARATUS

BACKGROUND OF THE INVENTION

1. Field of the Invention

The present invention relates to a backlight assembly and an LCD (Liquid Crystal Display) apparatus, and more particularly to a backlight assembly and LCD apparatus having uniform brightness and low power consumption.

2. Description of the Related Art

An LCD apparatus displays images using electric signals generated from a device processing image information. In order to display images, an LCD apparatus is generally provided with a liquid crystal control device and a light supply device. The liquid crystal control device controls the liquid crystal in response to the electric signals from the image information processing device, and the light supply device supplies light to the liquid crystal control device.

The light supply device may be an one-dimensional light source for generating one-dimensional light such as point light or linear light, or a two-dimensional light source for generating two-dimensional light such as surface light. The LCD apparatus employs the one-dimensional light source such as a CCFL (Cold Cathode Fluorescent Lamp) generating one-dimensional light.

However, the length of a CCFL becomes longer as the display size of an LCD apparatus becomes larger. Where the length of a CCFL becomes longer, a voltage for driving the CCFL, heat emitted from the CCFL and power consumption in the CCFL increase. Also, since the weight of a CCFL increases in accordance with increase in its length, the CCFL may be bent, thereby deteriorating display quality of the LCD apparatus.

BRIEF SUMMARY OF THE INVENTION

The present invention provides a backlight assembly having uniform brightness and requiring low power consumption.

The present invention also provides an LCD apparatus having uniform brightness and requiring low power consumption. In one aspect of the invention, there is provided a backlight assembly comprising:

a receiving container having a bottom surface and a sidewall extended from the bottom surface; a plurality of lamps disposed on the bottom surface, each of the lamps having two or more sub-lamps connected to each other in series, the two or more sub-lamps being disposed in a first direction, for generating light; a lamp holder disposed on the bottom surface in a second direction perpendicular to the first direction, for receiving a connection portion where the sub-lamps are connected to each other; and a diffusing plate disposed on the receiving container, for diffusing the light emitted from the lamps.

In another aspect, there is provided an LCD apparatus comprising:

a receiving container having a bottom surface and a sidewall extended from the bottom surface; a plurality of lamps disposed on the bottom surface, each of the lamps having two or more sub-lamps connected to each other in series and disposed in a first direction, wherein the sub-lamps generate light having first brightness at an area proximate the sub-lamps and light having second brightness at an area proximate a connection portion where the sub-lamps are connected to each other; a lamp holder disposed on the bottom surface, for receiving the connection portion; a brightness control unit for reflecting a portion of the light emitted from the lamps to reduce a brightness difference between the first brightness and the second brightness, the brightness control unit being disposed on the lamp holder; a diffusing plate disposed on the receiving container, for diffusing the light emitted from the lamps; and an LCD panel disposed on the diffusing plate, for receiving the light from the diffusing plate and displaying an image.

According to the present invention, a backlight assembly has the plurality of lamps for providing light to an LCD panel. Each of the lamps has two or more sub-lamps connected to each other in series. Also, a backlight assembly has a brightness control unit disposed between the sub-lamps to reduce the brightness difference between the sub-lamps. Thus, the backlight assembly may reduce consumption power of the lamps having the two or more sub-lamps and provide the light having uniform brightness to the LCD panel.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
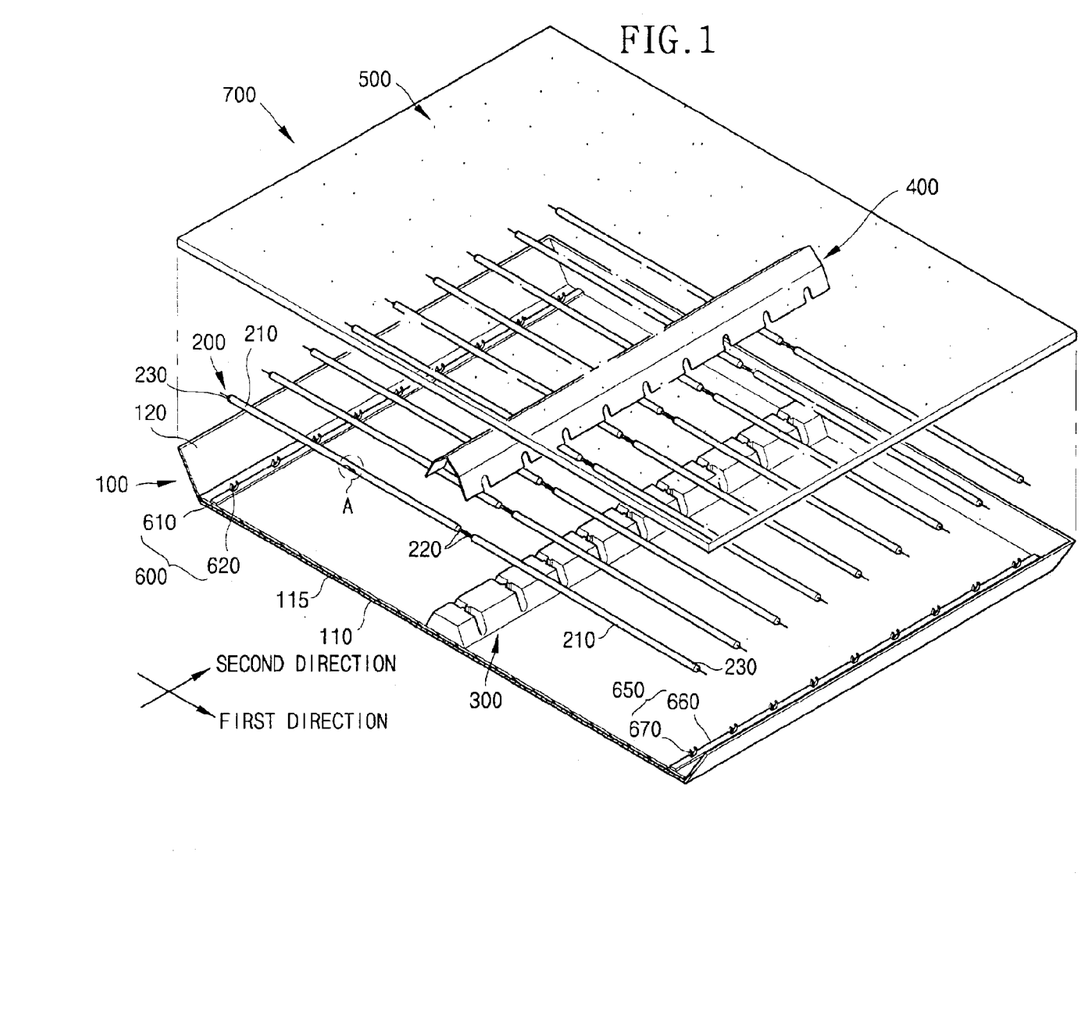
FIG. 1 is an exploded perspective view showing a backlight assembly according to an exemplary embodiment of the present invention.

FIG. 1 is an exploded perspective view showing a backlight assembly according to an exemplary embodiment of the present invention.

Referring to FIG. 1, the backlight assembly 700 includes a receiving container 100, a reflecting plate 115, lamps 200, a lamp holder 300, a brightness control unit 400 and a diffusing plate 500. A lamp 200 may have, for example, two or more sub-lamps 210 and the backlight assembly 700 may have the lamps 200 each having two or more sub lamps 210.

The receiving container 100 includes a bottom surface 110 and sidewalls 120 each extended from an edge portion of the bottom surface 110. The bottom surface 110, for example, has a rectangular shape. In FIG. 1, a first direction is the longitudinal direction of the bottom surface 110 and a second direction is the widthwise direction perpendicular to the first direction. The lamps 200 are disposed on the bottom surface 110 of the receiving container 100. Each of the sub-lamps 210 includes a lamp tube 211, a first electrode 220, and a second electrode 230.

Figure 2:
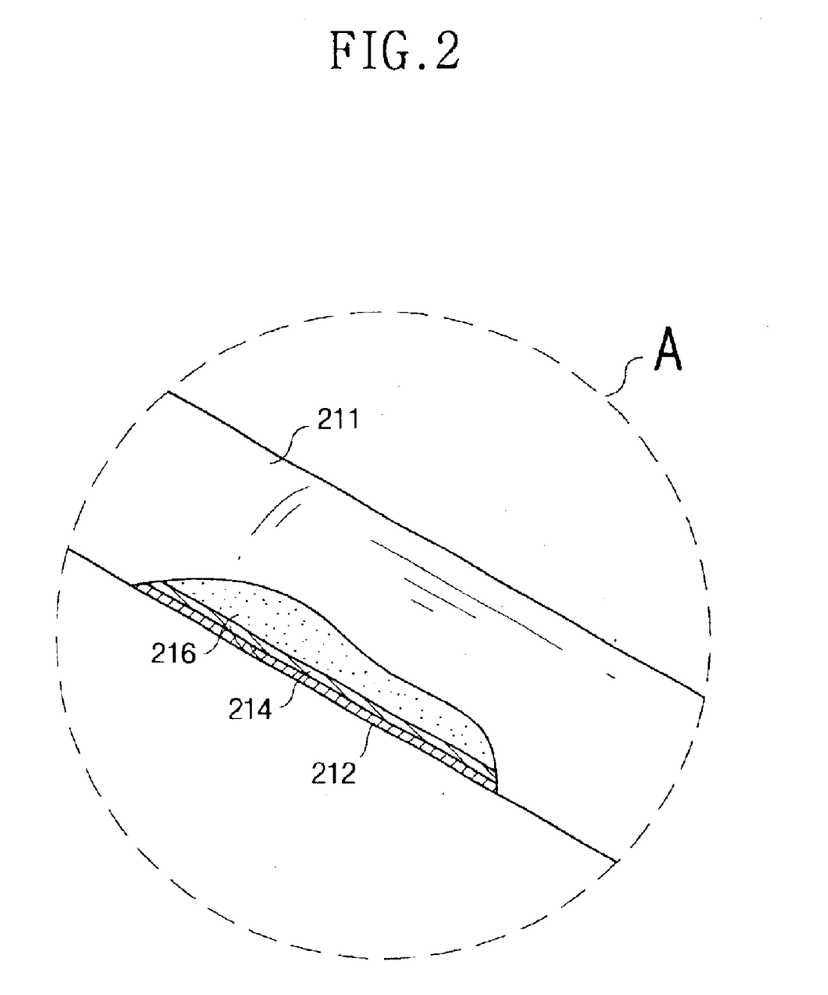
FIG. 2 is a schematic view showing a structure of a lamp shown in FIG. 1.

FIG. 2 is an enlarged view of portion A in FIG. 1. Referring to FIG. 2, the lamp tube 211 includes a tube body 212, a fluorescent material 214 and a discharge gas 216. The tube body 212 has a tube shape sealed at opposite end portions thereof. The fluorescent material 214 is deposited on an inner surface of the tube body 212 and the discharge gas 216 is injected into the tube body 212.

The first and second electrodes 220 and 230 are disposed inside the opposite end portions of the tube body 212 and connected to a lead line, respectively. The first and second electrodes 220 and 230 receive a discharge voltage having a potential difference appropriate to ionize the discharge gas 216 in the lamp tube 211, so that light is emitted from the lamp tube 211.

The lamp 200 having the two sub-lamps 210 is disposed on the bottom surface 110 of the receiving container 100 in the first and second directions. The two sub-lamps 210 of the lamp 200 are electrically connected in series through the first electrodes 220 thereof. Where the backlight assembly 700 has two or more lamps having a structure such as the lamp 200 having the two sub-lamps 210, the lamps are connected to each other in parallel.

Figure 3:
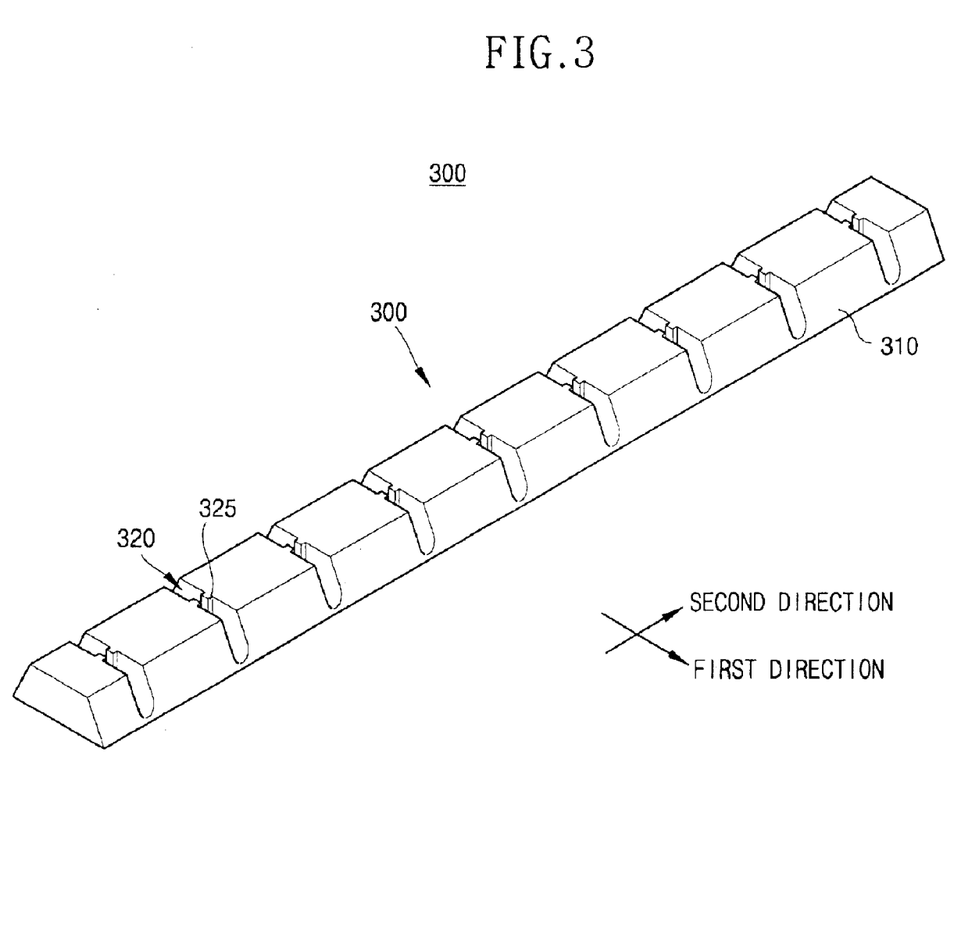
FIG. 3 is a perspective view showing a structure of the lamp holder shown in FIG. 1.

FIG. 3 is a perspective view showing the lamp holder 300 shown in FIG. 1. Referring to FIG. 3, the lamp holder 300 includes a lamp holder body 310 and lamp receiving grooves 320 disposed on the lamp holder body 310. The lamp holder body 310 is disposed on the bottom surface 110 in the second direction and has a bar shape, as a whole, with a bottom surface wider than its top surface.

The lamp receiving grooves 320 are formed on the lamp holder body 310, and the number of the lamp receiving grooves 320 is corresponding to the number of the lamps 200 employed in the backlight assembly 700. Each of the lamp receiving grooves 320 has a depth and a width suitable to receive the sub-lamp 210. The lamp receiving grooves 320 are each provided with a protrusion portion 325 for preventing the sub-lamps 210 from being movable because the sub-lamps 210 received into the lamp receiving grooves 320 may move in the first direction. The protrusion portions 325 are protruded from sidewalls, respectively, of the lamp receiving groove 320 and are disposed between the sub-lamps 210 of the lamp 200.

Figure 4:
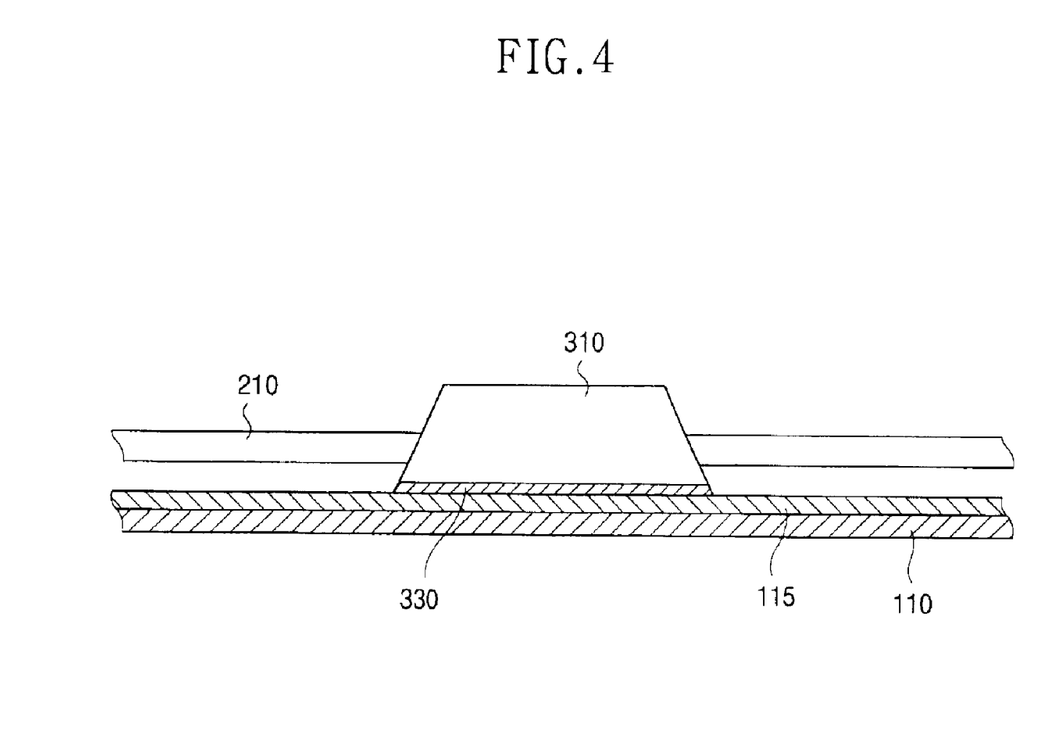
FIG. 4 is a schematic view showing an assembled structure between a lamp holder and a receiving container according to an exemplary embodiment of the present invention.

FIG. 4 is a schematic view showing an assembled structure between a lamp holder and a receiving container according to an exemplary embodiment of the present invention. Referring to FIG. 4, the lamp holder body 310 may be adhered to the bottom surface 110 using adhesive, for example, double-sided tape 330.

Figure 5:
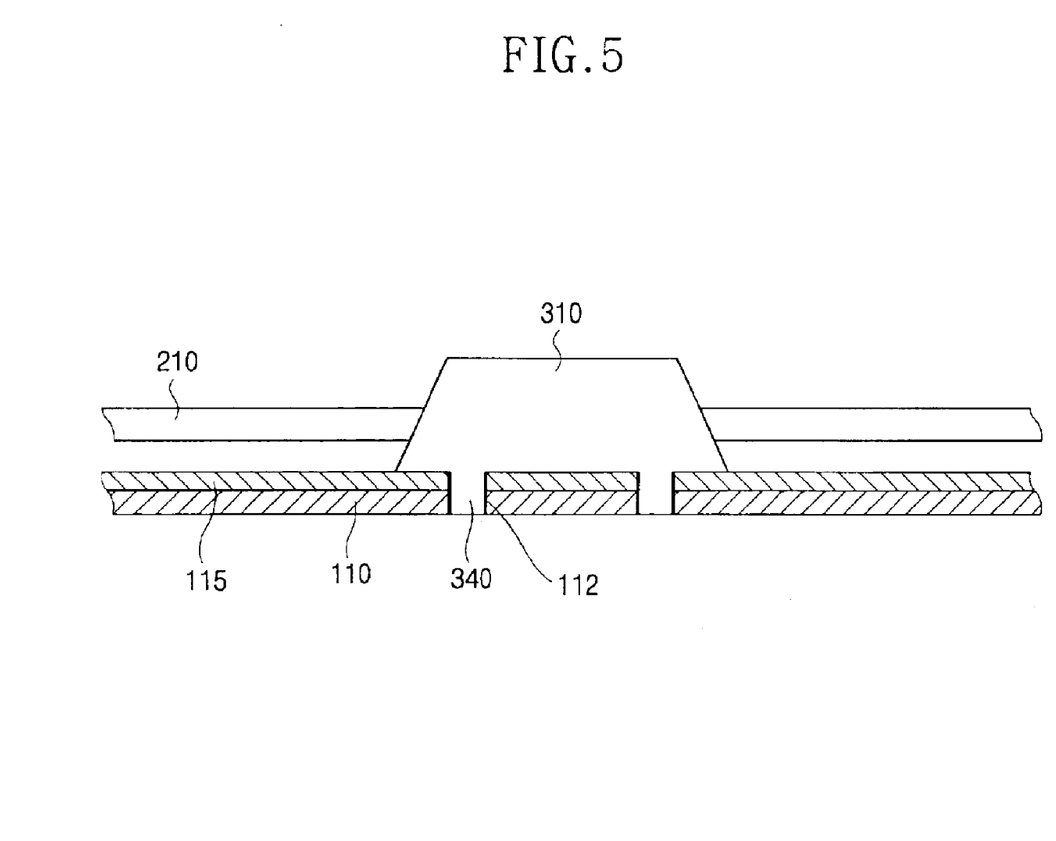
FIG. 5 is a schematic view showing an assembled structure between a lamp holder and a receiving container according to another embodiment of the present invention.

FIG. 5 is a schematic view showing an assembled structure between a lamp holder and a receiving container according to another embodiment of the present invention.

Referring to FIG. 5, the lamp holder body 310 is provided with engaging protrusions 340 and the bottom surface 110 is provided with engaging openings 112 corresponding to the engaging protrusions 340, respectively. The lamp holder body 310 and bottom surface 110 are engaged to each other by engaging the engaging protrusions 340 into the engaging openings 112, respectively.

Figure 6:
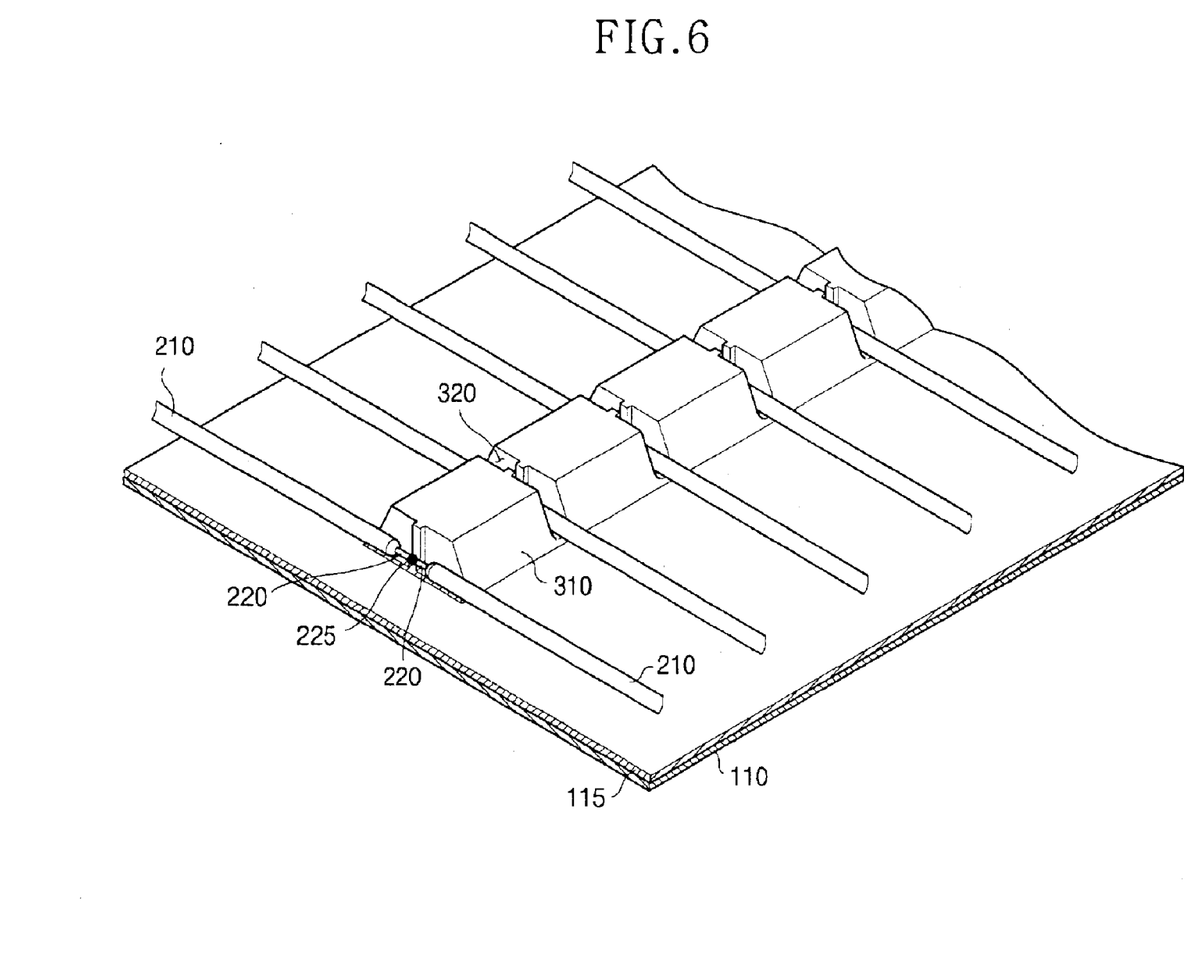
FIG. 6 is a schematic view showing a connection structure of two sub-lamps according to an exemplary embodiment of the present invention.

FIG. 6 is a schematic view showing a connection structure of the two sub-lamps 210 according to an exemplary embodiment of the present invention. Referring to FIG. 6, the lead lines each connected to the corresponding first electrode 220 of the respective sub-lamps 210 are soldered to each other by a solder 225.

Figure 7:
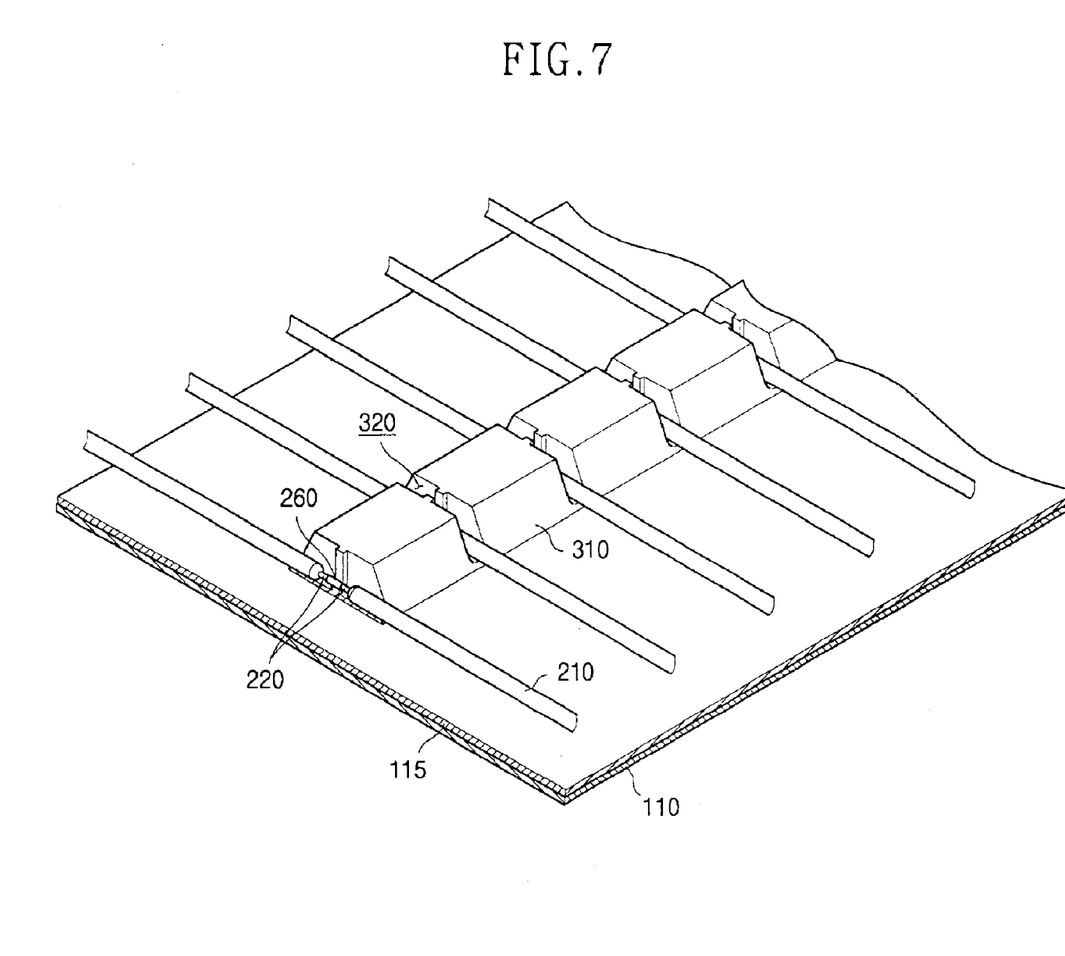
FIG. 7 is a schematic view showing a connection structure of two sub-lamps according to another embodiment of the present invention.

FIG. 7 is a schematic view showing a connection structure of the two sub-lamps according to another embodiment of the present invention.

Referring to FIG. 7, the lead lines each connected to the corresponding first electrode 220 of the respective sub-lamps 210 are electrically connected to each other by a conductive connection member 260 having, for example, a cylindrical shape. In this embodiment, the two sub-lamps 210 are connected to each other using the conductive connection member 260 such that a sub-lamp 210 may be easily replaced with a new sub-lamp when the sub-lamp 210 is in trouble.

Referring to FIG. 1 again, the second electrodes 230 of the sub-lamps 210 are connected to a first power supply unit 600 and a second power supply unit 650 on which power is externally applied.

The first power supply unit 600 is disposed on one end portion of the bottom surface 110 in the second direction. The first power supply unit 600 includes a first metal plate 610 having a band shape and a first gripping clip 620 for gripping one lead line of the second electrodes 230 of the two sub-lamps 210. The first gripping clip 620 provides the external power to the corresponding sub-lamp 210. As shown in FIG. 1, the first power supply unit 600 may have multiple first gripping clips 620 each for providing the external power to the corresponding sub-lamp 210.

The second power supply unit 650 is disposed on the other end portion of the bottom surface 110 in the second direction. In other words, the first and second power supply units 600 and 650 are disposed at the opposite end portions of the bottom surface 110. The second power supply unit 650 includes a second metal plate 660 having a band shape and a second gripping clip 670 for gripping one lead line of the second electrodes 230 of the two sub-lamps 210. The second gripping clip 670 provides the external power to the corresponding sub-lamp 210. The second supply unit 650 may also have multiple second gripping clips 670 each for providing the external power to the corresponding sub-lamp 210.

The first and second power supply units 600 and 650 receive the discharge voltage to make a predetermined potential difference between the first and second electrodes 220 and 230. The first electrodes 220 of the two sub-lamps 210 connected to each other may be connected to a separate power supply line. The power supply line may be grounded or receive an alternating current. The second electrodes 230 receive an alternating current from the first and second power supply units 600 and 650 as the discharge voltage.

On the other hand, the two sub-lamps 210 may receive the alternating current having a phase difference of 180 degrees through the second electrodes 230 from the first and second power supply units 600 and 650. In this case, the first electrodes 220 of the two sub-lamps 210 are electrically connected to each other using the solder or conductive connection member 260 without the separate power supply line.

Figure 8:
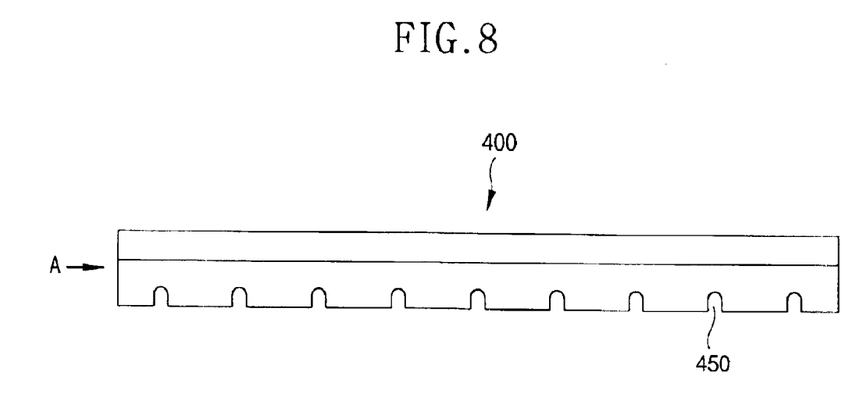
FIG. 8 is a schematic view showing a structure of the brightness control unit shown in FIG. 1.
Figure 9:
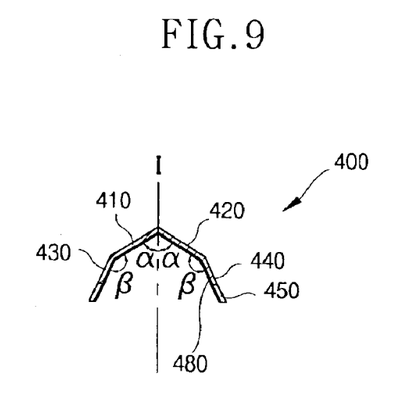
FIGS. 9 and 10 are cross-sectional views of the brightness control unit shown in FIG. 8.
Figure 10:
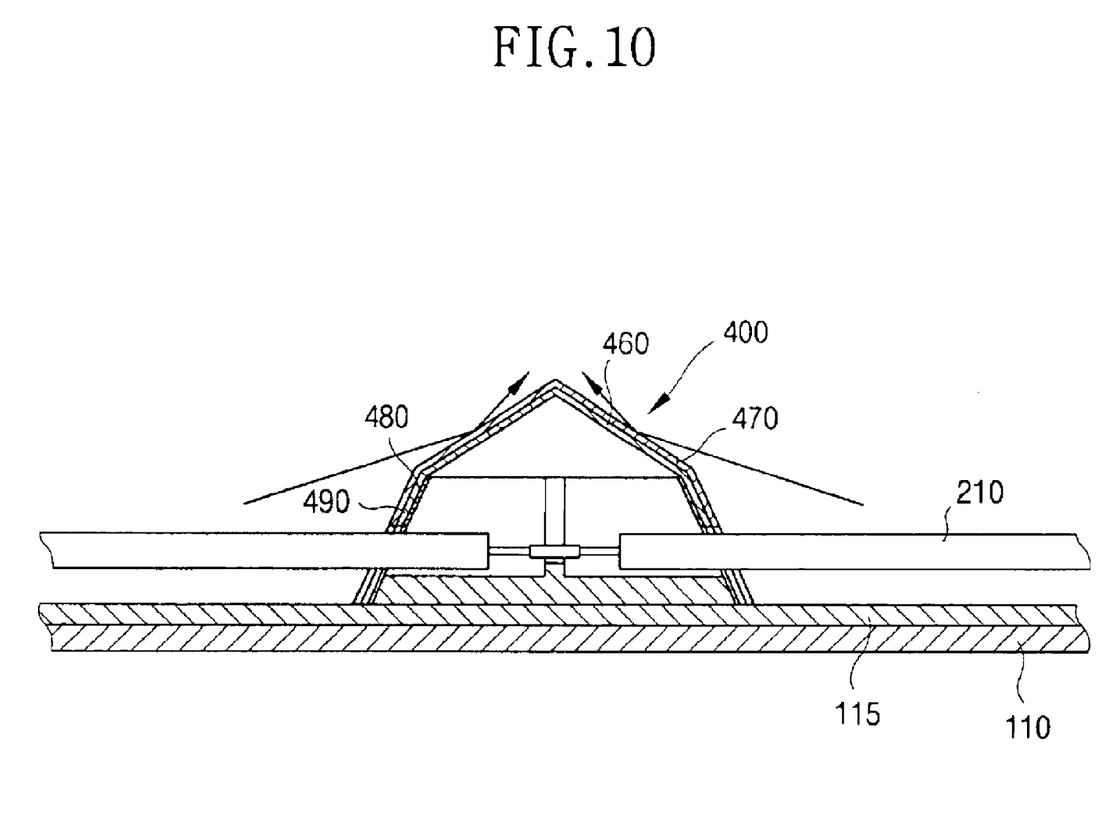

FIG. 8 is a schematic view showing a structure of the brightness control unit 400 shown in FIG. 1 and FIGS. 9 and 10 are cross-sectional views of the brightness control unit 400 shown in FIG. 8.

Referring to FIGS. 8 and 9, the brightness control unit 400 includes a first light diffusing surface 410, a second light diffusing surface 420, a third light diffusing surface 430 and a fourth light diffusing surface 440.

The first and second light diffusing surfaces 410 and 420 are inclined with respect to an imaginary line "I" at a first angle "α" and the first and second light diffusing surfaces 410 and 420 are symmetrical to each other. The third and fourth light diffusing surfaces 430 and 440 are inclined with respect to the first and second light diffusing surfaces 410 and 420 at a second angle "β", respectively. The third and fourth diffusing surfaces 430 and 440 are symmetrical to each other. The imaginary line "I" is perpendicular to the bottom surface 110 of the receiving container 100. The brightness control unit 400 diffuses the light from the lamps 200 and may be formed by an injection-molding manner of resin.

Referring to FIG. 10, the brightness control unit 400 includes a metal plate 460 bent to have the first to fourth light diffusion surfaces 410–440, a light diffusing layer 470, an adhesive 480 and an insulating layer 490.

The light diffusing layer 470 is disposed on an outer surface of the metal plate 460 by coating light diffusing material or adhering a light diffusing sheet thereto. The insulating layer 490 is disposed on an inner surface of the metal plate 460 so as to reduce a parasitic capacitance caused by disposing the light diffusing layer 470 on the metal plate 460.

Referring to FIGS. 8 and 9, the third and fourth light diffusing surfaces 430 and 440 are provided with lamp receiving openings 450 disposed at edge portions thereof. The lamp receiving openings 450 respectively receive the lamps 200 when combining to the lamp holder 300. In order to combine the brightness control unit 400 to the lamp holder 300, the adhesive 480 is partially disposed on an inner surface of the third and fourth light diffusing surfaces 430 and 440.

Figure 11:
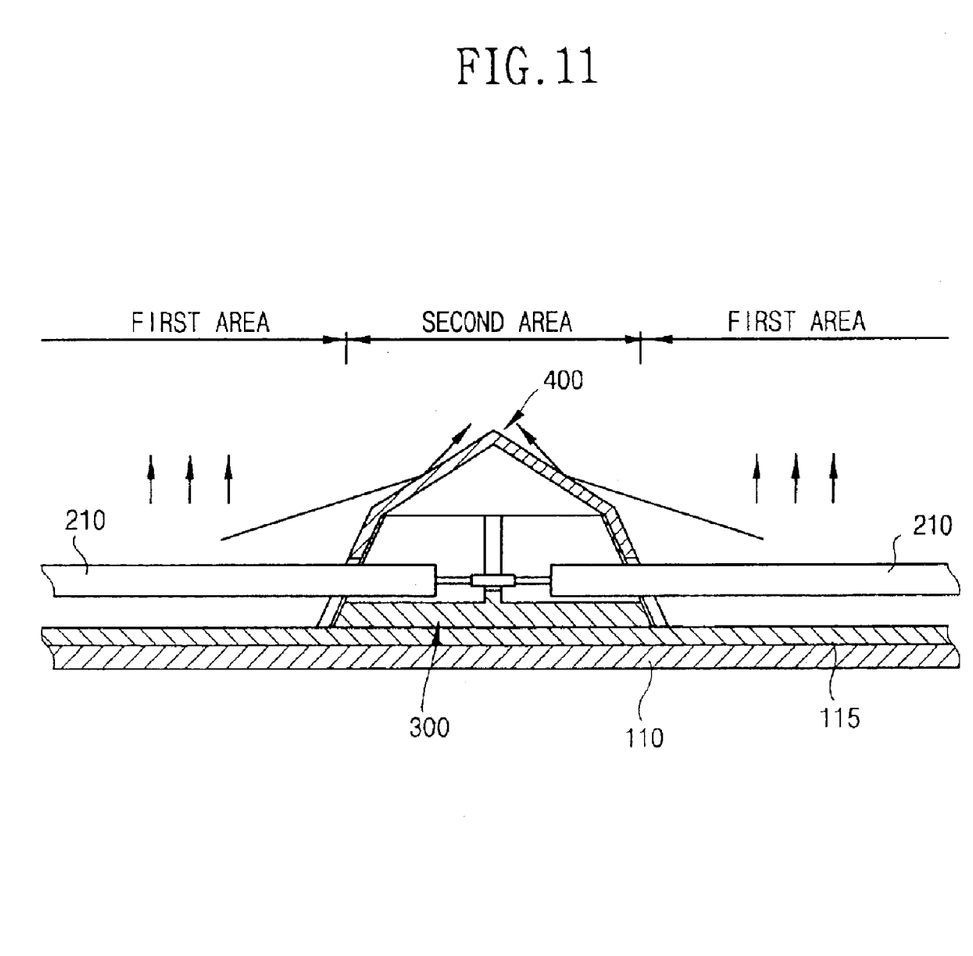
FIG. 11 is a schematic view for illustrating an operation of the brightness control unit shown in FIG. 10.

FIG. 11 is a schematic view for illustrating an operation of the brightness control unit 400 shown in FIG. 10.

Referring to FIG. 11, when turning on the lamps 200, the light emitting region may be divided into a first area having first brightness and a second area having second brightness darker than the first brightness. The second area is about an area between the two sub-lamps 210. A user may realize that the second area is darker than the first area due to the brightness difference between the first and second areas. The brightness control unit 400 reflects the light provided from the first area to the first and second light diffusing surfaces 410 and 420 on which the light is diffused toward the second area to reduce the brightness difference between the first and second areas. Then, the diffusing plate 500 (referring to FIG. 1) diffuses the light emitted from the lamps 200 and the light reflected from the brightness control unit 400 to provide light having uniform brightness. The diffusing plate 500 is disposed on the receiving container 100.

Figure 12:
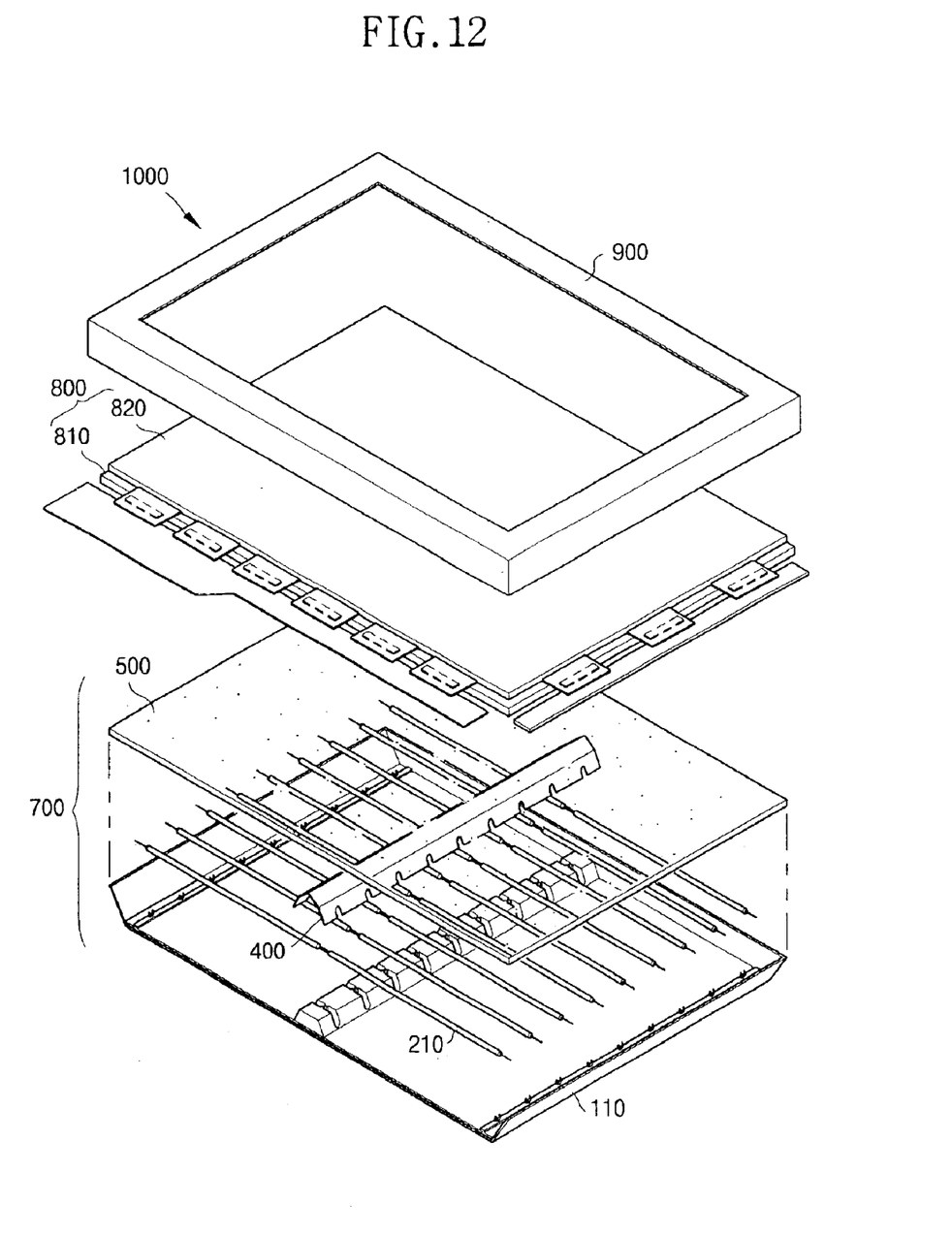
FIG. 12 is a perspective view showing a structure of an LCD apparatus according to the present invention.

FIG. 12 is a perspective view showing a structure of an LCD apparatus according to the present invention.

Referring to FIG. 12, the LCD apparatus 1000 includes a backlight assembly 700, an LCD panel assembly 800 and a chassis 900.

The LCD panel assembly 800 includes a TFT (Thin Film Transistor) substrate 810, a color filter substrate 820, and liquid crystal (not shown) interposed between the TFT substrate 810 and color filter substrate 820. The TFT substrate 810 comprises TFTs disposed on a transparent glass substrate in a matrix configuration and pixel electrodes for receiving a power voltage from the TFTs. The color filter substrate 820 is disposed facing the TFT substrate 810. The color filter substrate 820 includes a color filter disposed on a glass substrate facing the pixel electrode and a common electrode disposed over the glass substrate to cover the color filter. The LCD panel assembly 800 is disposed on the receiving container 100 of the backlight assembly 700.

The chassis 900 is combined to the receiving container 100 to prevent the LCD panel assembly 800 from being deviated from the receiving container 100.

According to the exemplary embodiments of the present invention, the backlight assembly has the plurality of lamps for providing light to the LCD panel. Each of the lamps has two or more sub-lamps connected to each other in series. Also, the backlight assembly has the brightness control unit disposed between the sub-lamps to reduce the brightness difference between the sub-lamps. Thus, the backlight assembly may reduce consumption power of the lamps and provide the light having uniform brightness. Further, an LCD apparatus according to the present invention may use sub-lamps each having a length shorter than that of a display area thereof.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   a receiving container having a bottom surface and sidewall extended from the bottom surface;
   a plurality of lamps, disposed on the bottom surface, to generate light, each of the lamps having two or more sub-lamps connected to each other in series, the two or more sub-lamps being disposed in a first direction;
   a lamp holder, disposed on the bottom surface in a second direction perpendicular to the first direction, to receive a connection portion where the sub-lamps are connected to each other; and
   a diffusing plate, disposed on the receiving container, to diffuse the light emitted from the lamps.

2. The backlight assembly or claim 1, wherein the lamps are disposed in parallel with the first direction and connected to each other in parallel.

3. The backlight assembly of claim 1, wherein the lamp holder comprises:
   a lamp holder body having a bar shape; and
   a lamp receiving groove disposed on the lamp holder body to receive the connection portion or the sub-lamps.

4. The backlight assembly or claim 3, wherein the lamp holder further comprises a protrusion portion disposed at the lamp receiving groove to prevent the sub-lamps from being moved.

5. The backlight assembly of claim 1, wherein the lamp holder is adhered to the bottom surface by an adhesive.

6. The backlight assembly of claim 1, wherein the lamp holder comprises an engaging protrusion disposed on a bottom surface of the lamp holder and the receiving container comprises an engaging opening corresponding to the engaging protrusion.

7. The backlight assembly of claim 1, further comprising a brightness control unit to reflect a portion of the light emitted from the lamps to reduce a brightness difference between a first area proximate the sub-lamps and a second area proximate the connection portion of the sub-lamps.

8. The backlight assembly of claim 7, wherein the brightness control unit comprises:

a first light diffusing surface to cover the connection portion;

a second light diffusing surface connected to the first light diffusing surface to cover the connection portion, the second light diffusing surface being inclined at a first angle with respect to the first light diffusing surface;

a third light diffusing surface connected to the first light diffusing surface and secured onto the lamp holder; and a fourth light diffusing surface connected to the second light diffusing surface and secured onto the lamp holder.

9. The backlight assembly of claim 8, wherein the third and fourth light diffusing surfaces comprise a plurality of lamp receiving openings each for receiving a corresponding one of the lamps.

10. The backlight assembly of claim 8, wherein the third and fourth light diffusing surfaces are adhered to the lamp holder by an adhesive.

11. The backlight assembly of claim 8, wherein the brightness control unit further comprises a metal plate disposed on inner surfaces of the first, second, third and fourth light diffusing surfaces.

12. The backlight assembly of claim 11, wherein the brightness control unit further comprises an insulating layer disposed on an inner surface of the metal plate to reduce a parasitic capacitance generated between the lamps and the metal plate.

13. The backlight assembly of claim 1, wherein each of the sub-lamps comprises a lamp body and first and second electrodes disposed at end portions of the lamp body.

14. The backlight assembly of claim 13, wherein the first electrodes of the respective sub-lamps are connected to each other with a solder.

15. The backlight assembly of claim 13, wherein the first electrodes of the respective sub-lamps are connected to each other with a conductive connection member having a cylindrical shape.

16. The backlight assembly of claim 13, further comprising a power supply unit, disposed at an end portion of the bottom surface of the receiving container in the second direction for providing power to the second electrodes of the sub-lamps.

17. The backlight assembly of claim 16, wherein the power supply unit comprises a metal plate having a band shape and a gripping clip which grips the second electrode of the sub-lamp to provide the power to the sub-lamp.

18. An LCD apparatus, comprising:

a receiving container having a bottom surface and a sidewall extended from the bottom surface;

a plurality of lamps disposed on the bottom surface, each of the lamps having two or more sub-lamps connected to each other in series, the two or more sub-lamps being disposed in a first direction, the lamps generating light having first brightness at an area proximate the sub-lamps and light having second brightness at an area proximate a connection portion where the sub-lamps are connected to each other;

a lamp holder, disposed on the bottom surface, for to receive the connection portion;

a brightness control unit or to reflect a portion of the light emitted from the sub-lamps to reduce a brightness difference between the first brightness and the second brightness, the brightness control unit being disposed on the lamp holder;

a diffusing plate, disposed on the receiving container, to diffuse the light emitted from the lamps; and an LCD panel, disposed on the diffusing plate, to receive the light from the diffusing plate and displaying an image.

19. The LCD apparatus of claim 18, wherein the brightness control unit comprises:

a first light diffusing surface to cover the connection portion;

a second light diffusing surface connected to the first light diffusing surface to cover the connection portion, the second light diffusing surface being inclined at a first angle with respect to the first light diffusing surface;

a third light diffusing surface connected to the first light diffusing surface and secured onto the lamp holder; and a fourth light diffusing surface connected to the second light diffusing surface and secured onto the lamp holder.

20. The LCD apparatus of claim 19, wherein the brightness control unit further comprises a plurality or lamp receiving openings each for receiving a corresponding one of the lamps, the lamp receiving openings being disposed on the third and fourth light diffusing surfaces.

21. The LCD apparatus of claim 19, further comprising an adhesive for adhering the third and fourth light diffusing surfaces to the lamp holder, the adhesive being deposited on the third and fourth light diffusing surfaces.

22. The LCD apparatus of claim 19, wherein the brightness control unit further comprises a metal plate disposed on inner surfaces of the first to fourth light diffusing surfaces.

23. The LCD apparatus of claim 22, wherein the brightness control unit further comprises an insulating layer disposed on an inner surface of the metal plate to reduce a parasitic capacitance generated between the lamps and metal plate.

24. A backlight assembly comprising:

a receiving container having a bottom surface and a sidewall extended from the bottom surface;

a plurality of lamps, disposed on the bottom surface, to generate light, each of the lamps having two or more sub-lamps connected to each other in series, the two or more sub-lamps being disposed in a first direction;

a lamp holder, disposed on the bottom surface in a second direction perpendicular to the first direction, to receive a connection portion where the sub-lamps are connected to each other;

a diffusing plate, disposed on the receiving container, to diffuse the light emitted from the lamps; and a cover unit, disposed on lamps, to cover the connection portion.

25. The backlight assembly of claim 24, wherein the cover unit reflects a portion of the light emitted from the lamps to reduce a brightness difference between a first area proximate the sub-lamps and a second area proximate the connection portion of the sub-lamps.

26. The backlight assembly of claim 24, wherein the lamps are disposed in parallel with the first direction and connected to each other in parallel.

27. The backlight assembly of claim 24, wherein the lamp holder comprises:

a lamp holder body having a bar shape; and a lamp receiving groove disposed on the lamp holder body to receive the connection portion of the sub-lamps.

28. The backlight assembly of claim 27, wherein the lamp holder further comprises a protrusion portion, disposed at the lamp receiving groove, to prevent the sub-lamps from being moved to the first direction.

* * * * *